United States Patent
Lunt et al.

(10) Patent No.: US 8,103,947 B2
(45) Date of Patent: Jan. 24, 2012

(54) COLLABORATIVE SYSTEM AND METHOD FOR GENERATING BIOGRAPHICAL ACCOUNTS

(75) Inventors: Christopher Lunt, Mountain View, CA (US); Andrew Halliday, Soquel, CA (US)

(73) Assignee: Timecove Corporation, Draper, UT (US)

( * ) Notice: Subject to any disclaimer, the term of this patent is extended or adjusted under 35 U.S.C. 154(b) by 1145 days.

(21) Appl. No.: 11/415,691

(22) Filed: May 2, 2006

(65) Prior Publication Data

US 2007/0261071 A1 Nov. 8, 2007

Related U.S. Application Data

(60) Provisional application No. 60/745,231, filed on Apr. 20, 2006.

(51) Int. Cl.
*G06F 17/00* (2006.01)
(52) U.S. Cl. .................... 715/200; 715/751
(58) Field of Classification Search ............. 715/200, 715/255, 751, 273
See application file for complete search history.

(56) References Cited

U.S. PATENT DOCUMENTS

| | | | |
|---|---|---|---|
| 5,157,768 A | 10/1992 | Hoeber et al. | |
| 5,287,448 A | 2/1994 | Nicol et al. | |
| 5,465,378 A * | 11/1995 | Duensing et al. | 715/233 |
| 5,850,219 A * | 12/1998 | Kumomura | 715/751 |
| 5,913,212 A | 6/1999 | Sutcliffe et al. | |
| 5,923,325 A | 7/1999 | Barber et al. | |
| 5,938,724 A * | 8/1999 | Pommier et al. | 709/205 |
| 6,026,148 A * | 2/2000 | Dworkin et al. | 379/88.18 |
| 6,230,324 B1 * | 5/2001 | Tomita et al. | 725/51 |
| 6,340,978 B1 | 1/2002 | Mindrum | |
| 6,405,197 B2 | 6/2002 | Gilmour | |
| 6,694,302 B2 | 2/2004 | Chuang et al. | |
| 6,701,322 B1 * | 3/2004 | Green | 1/1 |
| 6,803,925 B2 * | 10/2004 | Vronay | 715/730 |
| 6,848,077 B1 * | 1/2005 | McBrearty et al. | 715/206 |
| 6,874,126 B1 | 3/2005 | Lapidous | |
| 6,996,782 B2 | 2/2006 | Parker et al. | |
| 7,194,411 B2 | 3/2007 | Slotznick et al. | |
| 7,213,206 B2 | 5/2007 | Fogg | |
| 7,284,191 B2 * | 10/2007 | Grefenstette et al. | 715/230 |
| 7,287,225 B2 * | 10/2007 | Mindrum | 715/716 |
| 7,305,436 B2 | 12/2007 | Willis | |
| 7,321,883 B1 * | 1/2008 | Freedy et al. | 706/45 |
| 7,337,172 B2 | 2/2008 | Shapiro | |
| 7,366,759 B2 | 4/2008 | Trevithick et al. | |
| 7,424,669 B2 * | 9/2008 | Bhogal et al. | 715/230 |

(Continued)

OTHER PUBLICATIONS

Jones, A Biographic Researcher in Pursuit of an Aesthetic: The user of art-based (re)presentations in "performative" dissemination of life stories, Google Apr. 2006, pp. 66-85.*

(Continued)

*Primary Examiner* — Cong-Lac Huynh
(74) *Attorney, Agent, or Firm* — Thorpe North & Western LLP

(57) ABSTRACT

A collaborative system and method are used to capture, organize, share and preserve life stories. Life stories can be expressed in first person or third person. In either case, the process of developing the life stories is carried out with collaboration with and contributions from other users. The collaboration among the users is desirable because it serves to encourage and prompt users to record their life stories and also increases the relevance of the recorded life stories, so that an online community of users containing highly relevant and meaningful content, that is also relatively permanent in nature, about the users can be created.

10 Claims, 14 Drawing Sheets

U.S. PATENT DOCUMENTS

| | | | |
|---|---|---|---|
| 7,506,262 B2 | 3/2009 | Gupta et al. | |
| 7,558,853 B2* | 7/2009 | Alcorn et al. | 709/225 |
| 7,567,977 B1* | 7/2009 | White | 1/1 |
| 7,725,492 B2 | 5/2010 | Sitting et al. | |
| 7,810,021 B2* | 10/2010 | Paxson | 715/205 |
| 2001/0047373 A1* | 11/2001 | Jones et al. | 707/515 |
| 2002/0052768 A1 | 5/2002 | Walker et al. | |
| 2002/0103822 A1 | 8/2002 | Miller | |
| 2002/0152245 A1* | 10/2002 | McCaskey et al. | 707/530 |
| 2002/0169769 A1 | 11/2002 | Jackson | |
| 2002/0178185 A1* | 11/2002 | Kuchinsky et al. | 707/512 |
| 2003/0046318 A1* | 3/2003 | Schohn et al. | 707/513 |
| 2003/0055871 A1* | 3/2003 | Roses | 709/203 |
| 2004/0143603 A1* | 7/2004 | Kaufmann et al. | 707/104.1 |
| 2004/0153445 A1 | 8/2004 | Horvitz et al. | |
| 2004/0194034 A1 | 9/2004 | Vlamis | |
| 2004/0199867 A1* | 10/2004 | Brandenborg | 715/500.1 |
| 2005/0055625 A1 | 3/2005 | Kloss | |
| 2005/0060166 A1* | 3/2005 | Durham et al. | 705/1 |
| 2005/0182773 A1 | 8/2005 | Feinsmith | |
| 2005/0192913 A1 | 9/2005 | Lubart | |
| 2005/0193347 A1 | 9/2005 | Van Dam | |
| 2005/0197846 A1 | 9/2005 | Pezaris et al. | |
| 2005/0203801 A1 | 9/2005 | Morgenstern et al. | |
| 2005/0209887 A1 | 9/2005 | Pollner | |
| 2005/0216768 A1* | 9/2005 | Eppert | 713/201 |
| 2006/0064639 A1 | 3/2006 | Reid et al. | |
| 2006/0143043 A1* | 6/2006 | McCallie et al. | 705/2 |
| 2006/0224967 A1* | 10/2006 | Marmaros | 715/738 |
| 2006/0230061 A1 | 10/2006 | Sample et al. | |
| 2006/0248086 A1* | 11/2006 | Pahud | 707/10 |
| 2006/0253491 A1 | 11/2006 | Gokturk et al. | |
| 2006/0277477 A1 | 12/2006 | Christenson | |
| 2006/0282306 A1* | 12/2006 | Thissen-Roe | 705/11 |
| 2007/0016647 A1* | 1/2007 | Gupta et al. | 709/206 |
| 2007/0019849 A1* | 1/2007 | Kaufman et al. | 382/128 |
| 2007/0043688 A1 | 2/2007 | Kountz et al. | |
| 2007/0067268 A1* | 3/2007 | Dai et al. | 707/3 |
| 2007/0089053 A1* | 4/2007 | Uhlig et al. | 715/513 |
| 2007/0250479 A1 | 10/2007 | Lunt et al. | |
| 2007/0250496 A1 | 10/2007 | Halliday | |
| 2007/0250791 A1* | 10/2007 | Halliday et al. | 715/808 |
| 2007/0260996 A1* | 11/2007 | Jakobson | 715/781 |
| 2007/0261071 A1 | 11/2007 | Lunt | |
| 2008/0010585 A1* | 1/2008 | Schneider et al. | 715/201 |
| 2008/0120345 A1* | 5/2008 | Duncombe | 707/104.1 |
| 2008/0320547 A1* | 12/2008 | Lupoi et al. | 725/136 |
| 2009/0018867 A1* | 1/2009 | Reiner | 705/2 |
| 2010/0174675 A1* | 7/2010 | Mons et al. | 707/603 |
| 2011/0022966 A1* | 1/2011 | Rose et al. | 715/747 |

OTHER PUBLICATIONS

Benford et al., Designing Storytelling Technologies to Encourage Collaboration Between Young Children, ACM 2000, pp. 556-573.*

Mazalek et al., Tangible Viewpoints: A Physical Approach to Multimedia Stories, ACM 2002, pp. 153-160.*

Radev et al., Ranking Suspected Answers to Natural Language Questions Using Predictive Annotation, Google 2000, pp. 150-157.*

Xu et al, Evaluation of an Extraction-Based Approach to Answering Definitional Questions, ACM 2004, pp. 418-424.*

Marrs et al., Just-in-Time Teaching in Biology: Creating an Active Learner Classroom Using the Internet, Google 2004, pp. 49-61.*

Ellis et al., Designing Palaver Tree Online: Supporting Social Roles in a Community of Oral History, ACM 2001, pp. 474-481.*

"Today, someone needs you. Tomorrow . . . you may need someone too," http://www.wisdomlegacy.org/HeresHowItWorks.aspx, Mar. 17, 2006.

"WebBiographies.com Enables People to Document Their Lives and Build Dynamic Family Trees," http://www.lexdon.com/article/Web-Biographies.com_Enables_People_to_Document/45013.html, Apr. 18, 2006.

* cited by examiner

OurStory

| Image | Jane Johnson |
|---|---|
| | Profile Switch Profile Settings Logout |

My Story | Q&A | People

Preview Post

Title: My first job
Timeline Date: January 2, 1962

Q: What was your first job? What was the biggest lesson learned?

| Image | A: My very first job was picking potatoes ... |

Permissions:
○ Public
○ Restricted
    ☐ Family
    ☐ Circle X
    ☐ Circle Y
    ☐ Circle Z Upload Different Image: [    ] [Browse]

[Publish] [Cancel]

FIGURE 3D

OurStory

Jane Johnson

Profile  Switch Profile
Settings  Logout

My Story | Q&A | People

Q&A

*Image*

User A

| Select a Question to ask or Compose | Question Package: Life  Career  My Questions |
|---|---|
| Chapter 1: Childhood<br>Birth<br>Question 1<br>Question 2<br>Pre-School<br>Question 3<br>Question 4<br>Question 5<br>Siblings<br>Question 6 | Chapter 3: College<br>Academics<br>Question 14<br>Question 15<br>Athletics<br>Question 16<br>Question 17<br>Fraternity<br>Question 18<br>Question 19 |
| Chapter 2: Youth<br>Early Friends<br>Question 7<br>Question 8<br>Question 9<br>School<br>Question 10<br>Question 11<br>Question 12<br>Question 13 | Chapter 4: Adult<br>Job<br>Question 20<br>Question 21<br>Marriage<br>Question 22<br>Question 23<br>Question 24<br>Question 25<br>Question 26 |

FIGURE 4B

OurStory

Jane Johnson
Profile Switch Profile
Settings Logout

My Story | Q&A | People

Ask Question

Image

To:      User A

Title:   Summer Camp

Question: Did you go to summer camp? Which one, and what was it like? What friends do you remember meeting at summer camp? Any great adventures while away at camp?

Upload Photo: [ Browse ]

[ Preview ]

FIGURE 4C

COLLABORATIVE SYSTEM AND METHOD FOR GENERATING BIOGRAPHICAL ACCOUNTS

CROSS-REFERENCE TO RELATED APPLICATION

This application claims the benefit of U.S. Provisional Patent Application Ser. No. 60/745,231, entitled "Collaborative System and Method for Generating Biographical Accounts," filed Apr. 20, 2006, which is herein incorporated by reference.

BACKGROUND OF THE INVENTION

1. Field of the Invention

The present invention relates generally to systems and methods used to record life stories and, more particularly, to systems and methods that are used to capture, organize, share and preserve life stories through collaboration with and contributions from multiple users.

2. Description of the Related Art

Life stories can be recorded in a variety of different ways. Diaries and journals are popular offline forms of recording life stories and are kept in a contemporaneous manner. Diaries and journals provide word accounts of life events and typically do not include any photos that help relate a story visually. Scrapbooks, on the contrary, depict life events through pictures more so than words. Word accounts of events in scrapbooks are typically in the form of an annotation, as a way to provide a brief description of a picture. Scrapbooks often lack a detailed word accounting of the events that have been captured as images.

Today, diaries, journals and scrapbooks are being kept increasingly in electronic form and are shared with other people over the Internet. A blog (or weblog) can sometimes function as an online diary or journal that is shared with other people over the Internet, and online digital photo sharing sites allow users to maintain a scrapbook in electronic form and shared with other users. Both services combine text and images, and their popularity has exploded in recent years as digital photography and broadband access have become affordable to most people. Also, a blog typically has a date entry for the associated text, and a digital photo sharing site typically has a date entry for the associated picture.

U.S. Patent Application Pub. No. 2004/0194034 by Vlamis, entitled "Computerized Scrapbook System," discloses a method and system for users to create and maintain a scrapbook in a computerized system. The system enables a user to import images, type notes, maintain a journal, store memorable information, and search and view their stored information. In essence, this system automates the scrapbook process and provides users with a format to quickly and cost-effectively create duplicate copies of their scrapbook.

A web-based service known as Wisdom Legacy provides users with a platform for creating their autobiographical accounts. This service employs a profiling technique to develop interview questions to be posed to the users and a book outline for the autobiography. The person's responses to the interview questions are used to create the autobiographical accounts for the book or manuscript that is intended to be published and passed down through the generations.

Other web-based services that offer tools for helping users record their biographies include lifebio.com, biowriters.com, webbiographies.com, and therememberingsite.org. All of these services provide web templates and form questions to help users record their biographies or, in some cases, biographies on behalf of others. The service provided by webbiographies.com allows users to create a network of friends and family with whom their biographies can be shared as they are being composed.

SUMMARY OF THE INVENTION

The present invention provides systems and methods that are used to capture, organize, share and preserve life stories. In accordance with the present invention, life stories can be expressed in first person or third person and, in either case, the process of developing the life stories is carried out with collaboration with and contributions from other users.

According to one embodiment of the present invention, the process of developing life stories of a first user is driven by other users, for example, by allowing questions that are posed to the first user and answered by the first user to be authored or selected by other users, such as friends and family or other members of the first user's social network. By permitting other users to author or select questions for the first user, the life stories expressed by the first user in response to such questions are likely to have more relevance, because the first user is answering questions that other users who have a relationship with him or her want answered, rather than answering questions selected by a computer system or by disinterested parties such as experts or professionals.

According to a further aspect of the present invention, a picture may be attached to the question that is posed to the first user. This feature is desirable for several reasons. The picture helps the first user remember the events associated with the picture, and can be saved as part of the first user's life story along with his or her word account of the events associated with the picture. The picture also helps the person who is attaching the picture to ask more specific questions about the time and place of the picture, the persons depicted in the picture, and the events represented in the picture.

Embodiments of the present invention also maintain a queue of questions that are posed to a user. The queue of questions permits multiple questions by multiple users to be posed to the same user. The queue is managed through a simple interface by which the user can navigate through the multiple questions that are posed to him or her.

Access controls are provided in embodiments of the present invention for multiple purposes. A first purpose may be to limit viewing privileges. When a user posts a life story, the user can set the viewing privileges. The user can set the viewing privileges to public, in which case any user may view and comment on the life story, or the user can restrict viewing and commenting privileges to certain private circles that the user has defined. A second purpose may be to limit who may ask questions. In general, all users have the right to interview another user. However, as a way to deter spamming, the interview privileges may be restricted only to connected users.

An additional access level may be defined for permitting one user to contribute stories to be posted in the account of another user. This feature may be used by two closely related persons (e.g., husband and wife), who have many common experiences. It may also be used when one user has a picture containing another user and submits the picture and a word account of the events represented in the picture for posting in the account of the other user. In the embodiments of the present invention described herein, the right to post life stories on behalf of a user is set by the user in his or her profile.

As a further aspect of the present invention, a single user may create multiple profiles and maintain life stories for each person represented in the profiles. This feature may be used in situations where it is preferred to write the life stories from a third person point of view or the subject of the life stories is not computer sawy. Profiles for groups and fictional characters may be created this way so that group stories or fictional life stories may be recorded using the embodiments of the present invention.

According to another embodiment of the invention, users may also collaborate in the creation of questions and questions sets. A question or a question set that has been authored or edited by a first user may be made available to other users and a second user may use that question to interview a person in his or her private circle.

Embodiments of the present invention also employ question filters to limit the questions that are made available to a user for selection when the user desires to interview another user. The filtering is done automatically based on the profile settings of the user to be interviewed. For example, if the user to be interviewed is not married, questions that are only relevant to married people are filtered and are not displayed as available selections to the user who is selecting the interview questions. Other profile settings that may be used in the filtering process include age, gender, number of children, etc.

The features of the present invention described above help users collaborate with other users in the process of creating life stories. The collaboration is desirable because it serves to encourage and prompt users to record their life stories and also increases the relevance of the recorded life stories, so that an online community of users containing highly relevant and meaningful content, that is also relatively permanent in nature, about the users can be created.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-D are schematic representations of web pages that are used in posting life stories to the web site.

FIGS. 4A-D are schematic representations of web pages that are used in creating and managing questions that are posed to other users.

DETAILED DESCRIPTION

Figure 1:
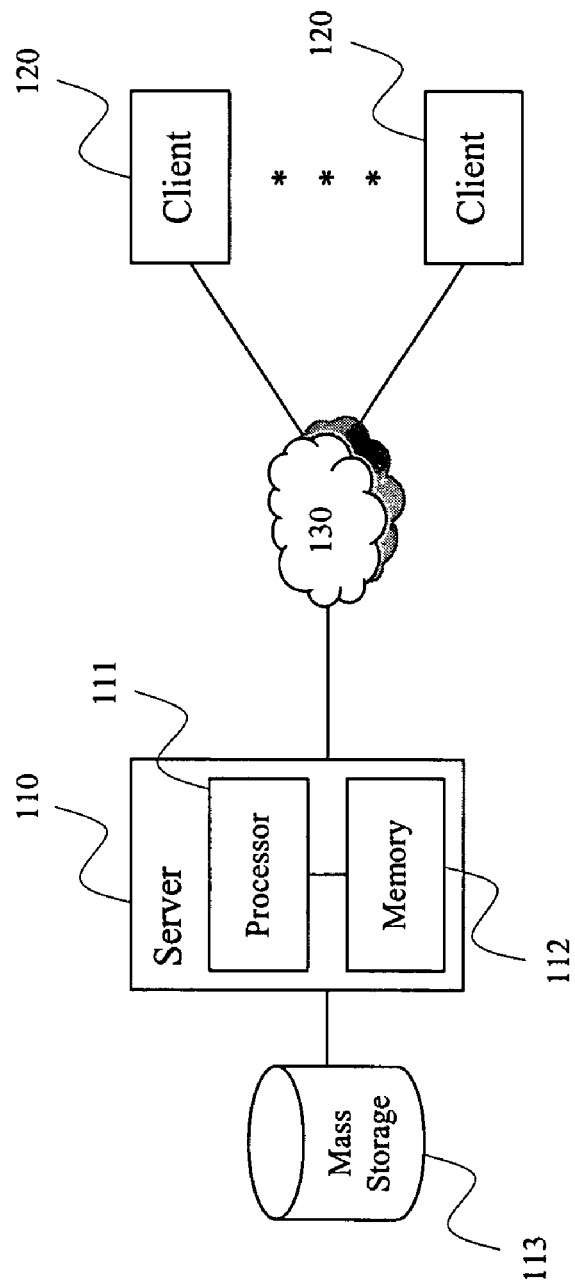
FIG. 1 illustrates a networked computer environment in which systems and methods according to embodiments of the present invention may be implemented.

FIG. 1 illustrates a networked computer environment in which systems and methods according to embodiments of the present invention may be implemented. As shown, the networked computer environment includes a server computer 110 and a plurality of client computers 120 (only two of which are shown). The server computer 110 and the client computers 120 are connected over a computer network 130, e.g., the Internet. The components of the server computer 110 that are illustrated in FIG. 1 include a processor 111 and a system memory 112. The server computer 110 is connected to a mass storage unit 113 that stores the contents managed by the server computer 110. Each client computer 120 includes conventional components of a computing device, e.g., a processor, system memory, a hard disk drive, input devices such as a mouse and a keyboard, and output devices such as a monitor (not shown).

The server computer 110 is programmed to operate as a network server that communicates with the client computers 120. In the embodiments of the present invention described herein, the server computer 110 is programmed as a web server that communicates with the client computers 120 using the TCP/IP protocol, and hosts a web site that can be accessed by the client computers 120. The client computers 120 are programmed to execute web browser programs and access the web pages managed by the server computer 110 by specifying a uniform resource locator (URL) for the server computer 110 into the browser.

The server computer 110 manages the contents stored in the mass storage unit 113 using a relational database software. The contents include profile data of the registered users of the web site. The profile data specify: user ID, password, name, e-mail, address including zip code, gender, marital status, date of birth, occupation, a pointer to an image file, various permission settings, and other similar data. The contents further include interview questions, multimedia files such as image files, video files, audio files and flash animation files, life stories posted by the users, commentaries made to the posted life stories, user-defined private circle data, and such other data needed by the server computer 110 to process data received from the users and render web pages requested by the users.

In the embodiments of the present invention described below, users are respectively operating the client computers 120 that are connected to the server computer 110 over the Internet. Also, web pages that are displayed to a user are transmitted from the server computer 110 to that user's client computer 120 and processed by the web browser program stored in that user's client computer 120 for display through the monitor of that user's client computer 120.

Figure 2:
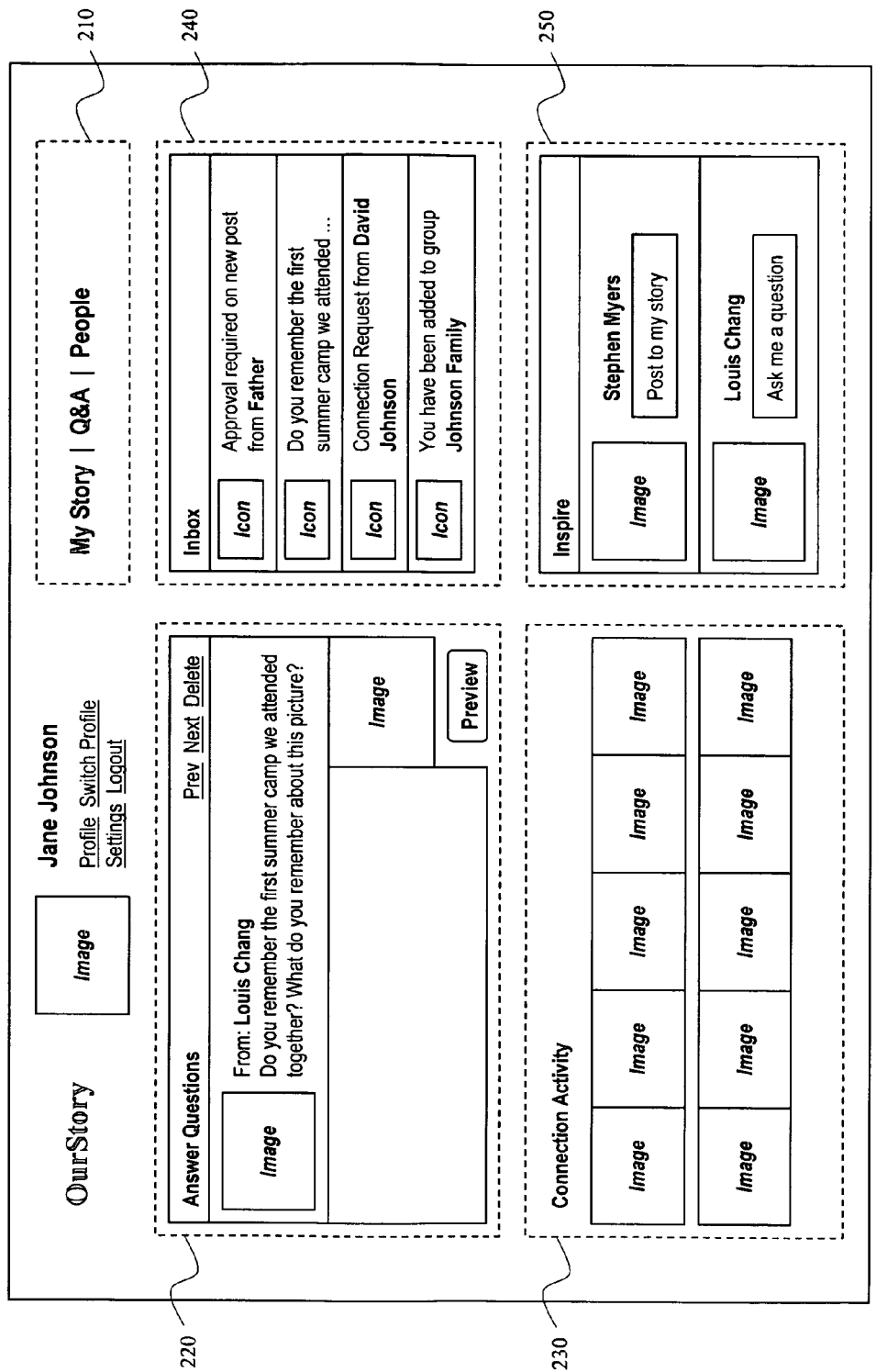
FIG. 2 is a schematic representation of a sample web page that is displayed to a user when the user logs into the web site that manages many of the features of the present invention.

FIG. 2 is a schematic representation of a web page that is generated by the server computer 110 and transmitted to a user for display when the user accesses the web site managed by the server computer 110, and logs in using his or her user ID and password. The web page identifies the web site "Our-Story" and the user who logged in with the user's name (Jane Johnson) and the user's image. The user can access her life stories by accessing the My Story hyperlink provided in a navigation section 210 of the web page. Other hyperlinks are provided on the web page to allow the user to view and change her profile (Profile hyperlink) and the account settings (Settings hyperlink).

The web site permits a single registered user to keep multiple profiles and maintain life stories for each person, group, and sometimes fictional characters, represented in the profiles. This feature may be used in situations where it is preferred to write the life stories from a third person point of view, or for a group of people (e.g., the Smith family or the 1980 U.S. Olympic hockey team) or a fictional character, or where the subject of the life stories is not computer sawy. The Switch Profile hyperlink is provided to users who are maintaining multiple profiles to allow such users to switch to another profile and view and manage the life stories of the person, group, or fictional character represented in the other profile.

The web page further provides various other graphical user interface (GUI) elements. They include a navigation section 210, a question section 220, an image gallery 230, an inbox 240, and a collaboration section 250.

Figure 3A:
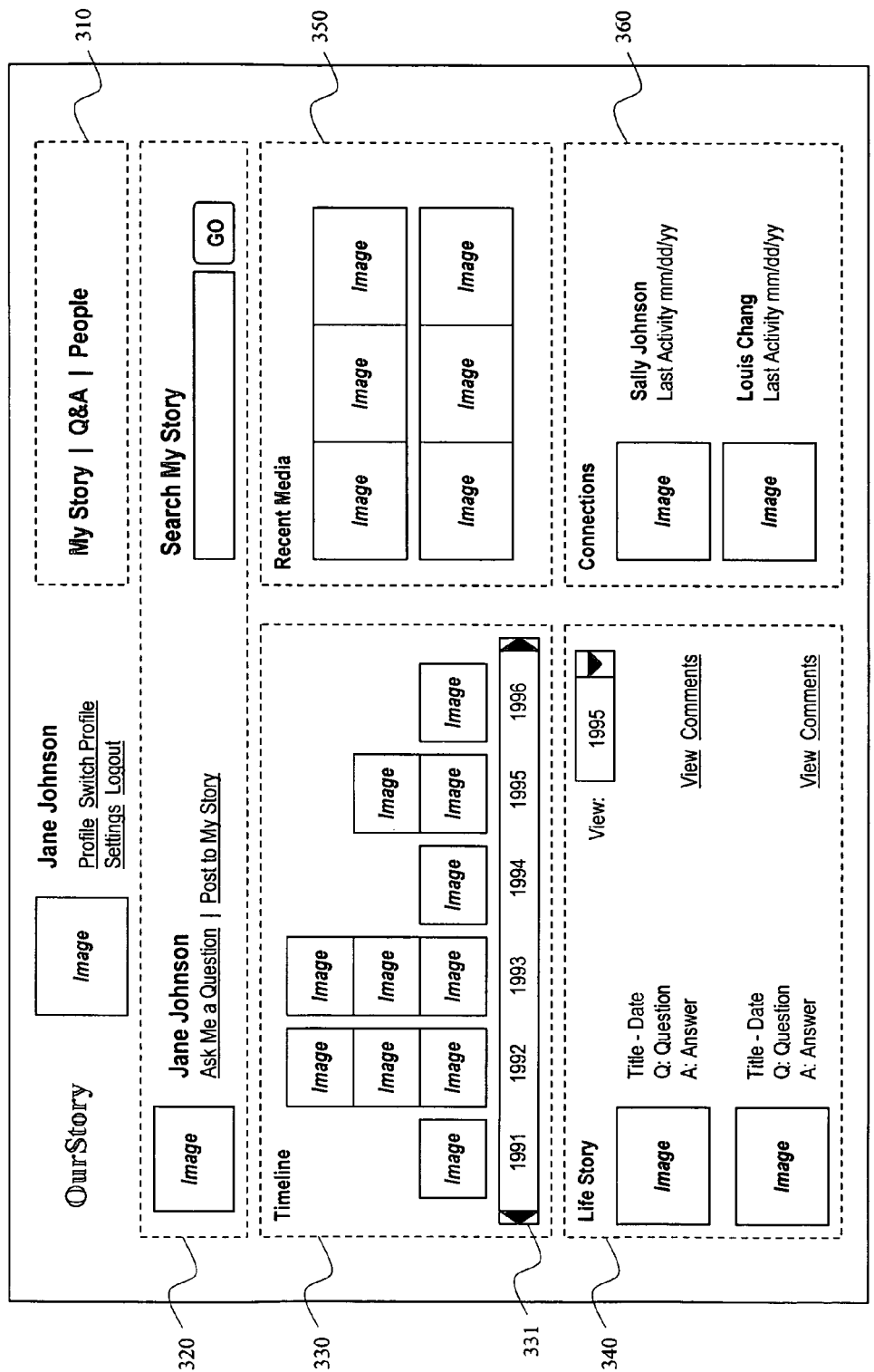
Figure 4A:
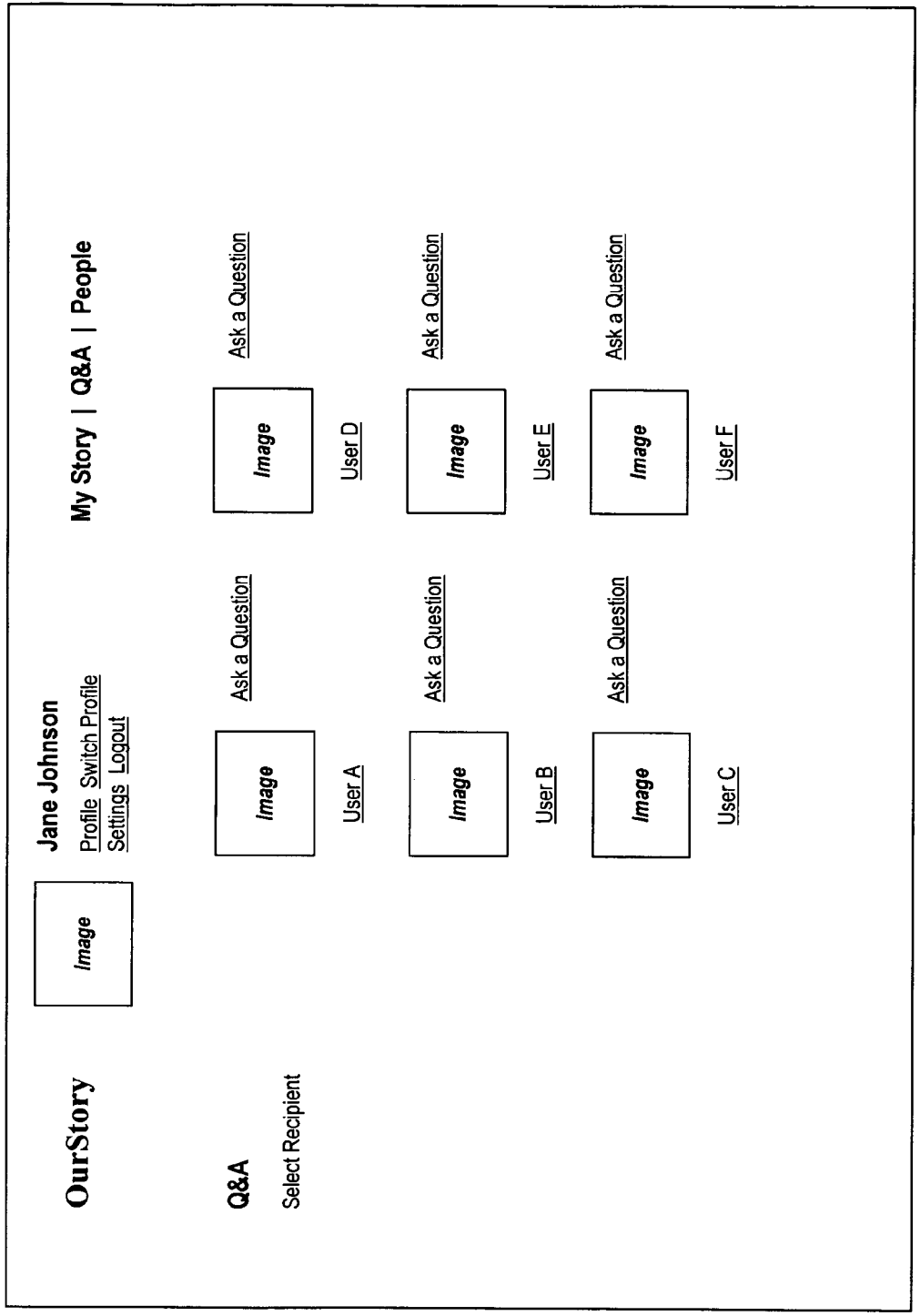
Figure 5:
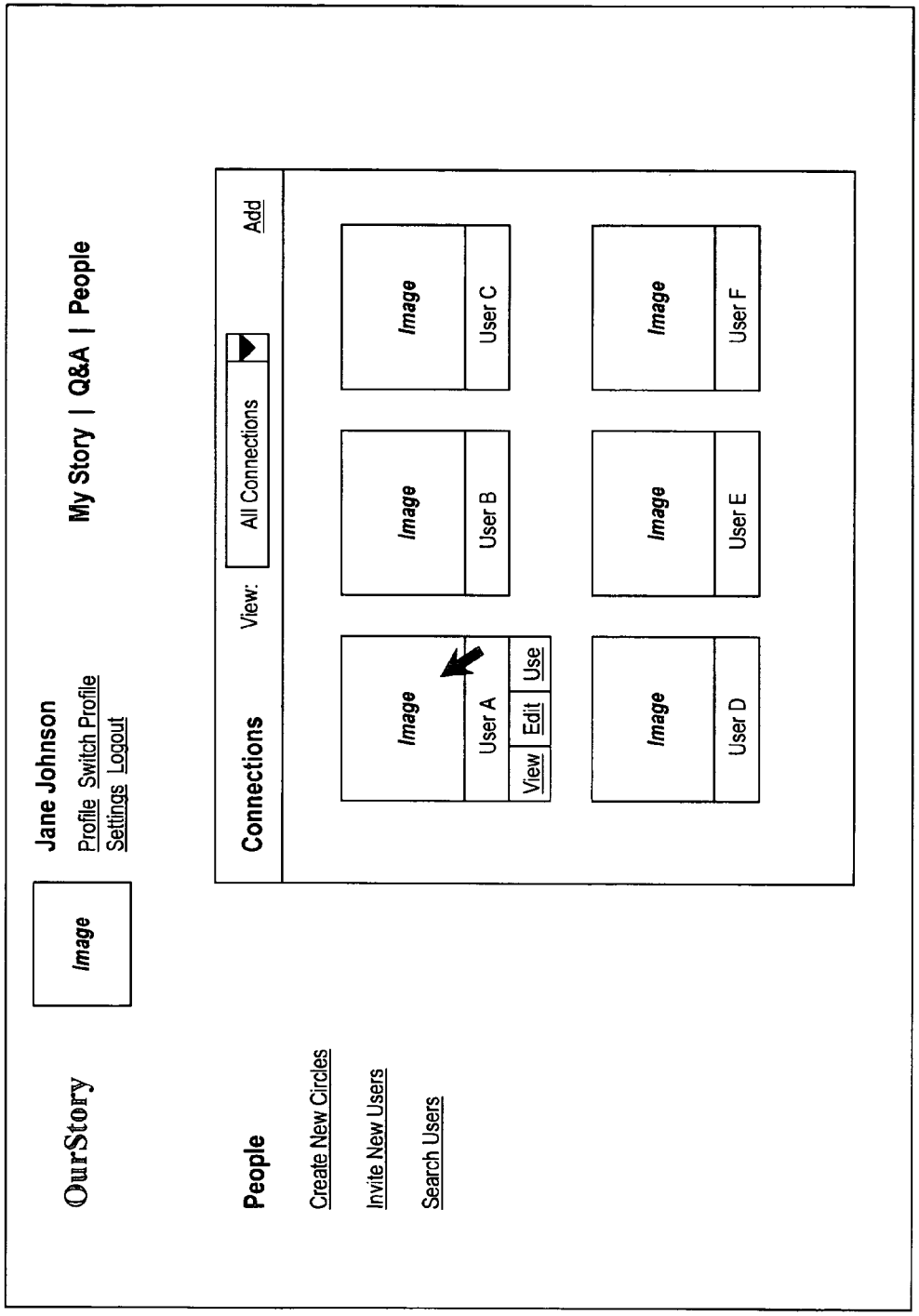
FIG. 5 is a schematic representation of a web page that is used in managing a user's connections.

The navigation section 210 includes hyperlinks to web pages that are used to view, modify or add to the user's life stories (My Story), interview questions (Q&A), and relationships (People). FIGS. 3A, 4A and 5 are schematic representations of web pages that are generated by the server computer 110 and displayed to the user when the user selects the My Story, Q&A, and People hyperlinks, respectively.

The question section 220 displays the most recent question that has been posed to the user and various other information associated with the question, including the name and image of the person asking the question, any image attached to the question by the person, and a text input field in which the user can answer the question. The question section 220 also provides question navigation hyperlinks "Previous" and "Next" using which the user can turn to the previous question or the next question that is in the queue of questions that have been posed to this user. The input of the answer followed by a click on the Preview button causes the display of a preview web page similar to the one shown in FIG. 3D, using which the user can either publish the answer as a life story or cancel it. If the user publishes the answer, the server computer 110 saves the answer and the associated image in the mass storage unit 113. Further, in response to either the publishing or canceling action, the next question in the queue is displayed to the user. The user may also delete a question from the queue of questions by clicking on the "Delete" hyperlink. In response to this action, the next question in the queue is displayed to the user.

The image gallery 230 provides the user with a pictorial snapshot of the more recent activities by persons who are connected to the user or by those who belong to a special group defined by the user, e.g., the user's immediate family or the user's closest friends. The activities that are tracked by the image gallery 230 include recent postings of life stories by the connected users or members of the special group and recent comments made by them to the user's life stories. The image gallery 230 may also include recent instructional, informational, and inspirational postings submitted by other users and system generated content that are posted to encourage users to post their life stories. A click on any image hyperlinks the user to the thread corresponding to that image. A "thread" consists of a post and any comments made concerning the post.

The inbox 240 displays messages generated by the web site in response to actions taken by the other users of the web site. The messages include notices of actions taken by other users (e.g., "You have been added to group Johnson Family") and summaries of tasks that the user has been asked to complete (e.g., "Approval required on new post from Father" and "Connection Request from David Johnson"). An icon is displayed alongside each message to help the user quickly identify the content of the message.

The collaboration section 250 provides hyperlinks to a web page used to post a life story on behalf of another user and a web page used to ask questions to another user. The identity of the other user is displayed in this section along with that person's image. Only those users who have given the user sufficient access rights will appear in this section. In the example given here, Jane Johnson has the right to post stories on behalf of Stephen Myers, and Jane Johnson has the right to ask Louis Chang questions.

FIG. 3A is a schematic representation of the web page that is generated by the server computer 110 and transmitted to a user for display when the user selects the My Story hyperlink from the navigation section 210. The web page provides a navigation section 310 which functions in the same manner as the navigation section 210 of FIG. 2. It also has a profile ID section 320, a timeline section 330, a life story section 340, a recent media section 350 and a connections section 360.

Figure 3B:
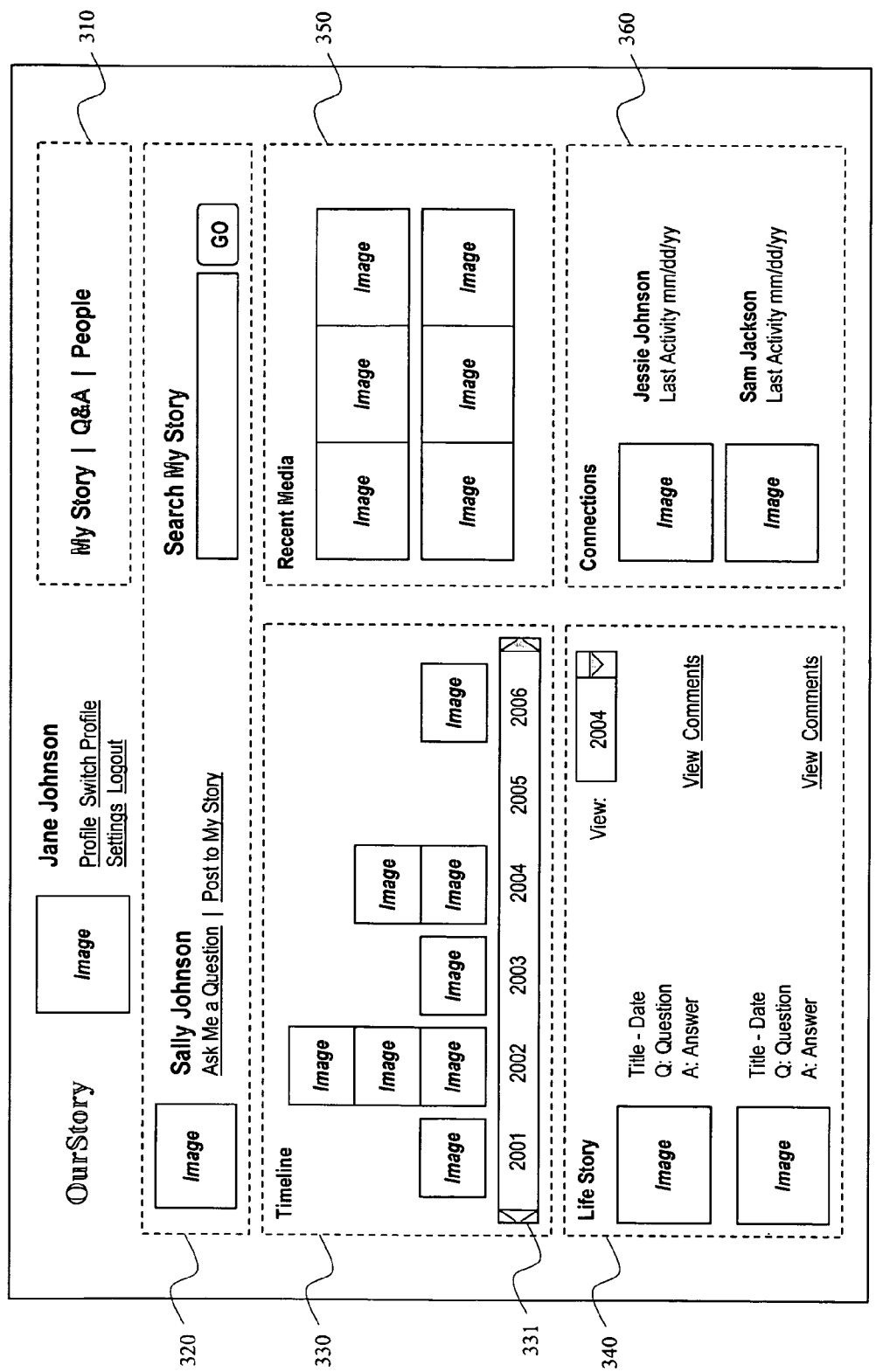

The profile ID section 320 identifies the person whose life stories are presented on this web page. FIG. 3A, for example, presents the life stories of the logged in user, Jane Johnson. On the other hand, FIG. 3B presents the life stories of another user of the web site, Sally Johnson. In this case, the logged in user, Jane Johnson, is accessing the My Story web page of the other user, Sally Johnson. In cases where multiple profiles are managed by a single registered user, the profile ID section 320 might also identify a person, group or a fictional character whose life, group or fictional stories are being managed by the one user. The profile ID section 320 also includes hyperlinks to web pages for asking questions (Ask Me a Question) and for posting life stories (Post to My Story). A search feature is provided in this section as well.

The timeline section 330 presents the user's life stories pictorially using images from posts organized according to a chronology bar 331. All of the images appearing on top of a specified time period correspond to posts that describe events of that time period. A click on any image hyperlinks the user to the post corresponding to that image. The range of time periods represented by the chronology bar 331 can be changed by clicking on the arrows at the ends of the chronology bar.

The life story section 340 provides a display of the life stories of the user. The display field is limited to a particular time period that is selected using the View drop-down menu. Each life story normally includes a title, the date of the event depicted in the life story, a word account of the event, and an image representative of the event. If a question asked by another user (or by the user herself) prompted the posting of a life story, the question is also displayed. A life story post can be viewed and edited by clicking on the View hyperlink. A life story thread including comments made to the life story can be viewed by clicking on the Comments hyperlink. In situations where life stories of another user are being accessed, as in FIG. 3B, a life story thread can be viewed by clicking on the View hyperlink and comments can be made to the life story by clicking on the Comments hyperlink.

The recent media section 350 includes recent images that have been attached to posts and comments by the user. It provides a snapshot of the user's recent activities at the web site. A click on any image causes the thread containing the image to be displayed.

The connection section 360 provides a list of connected users and the date of their most recent activity at the web site. A click on the name or image of any connected user causes the My Story web page of that user to be displayed.

Figure 3C:
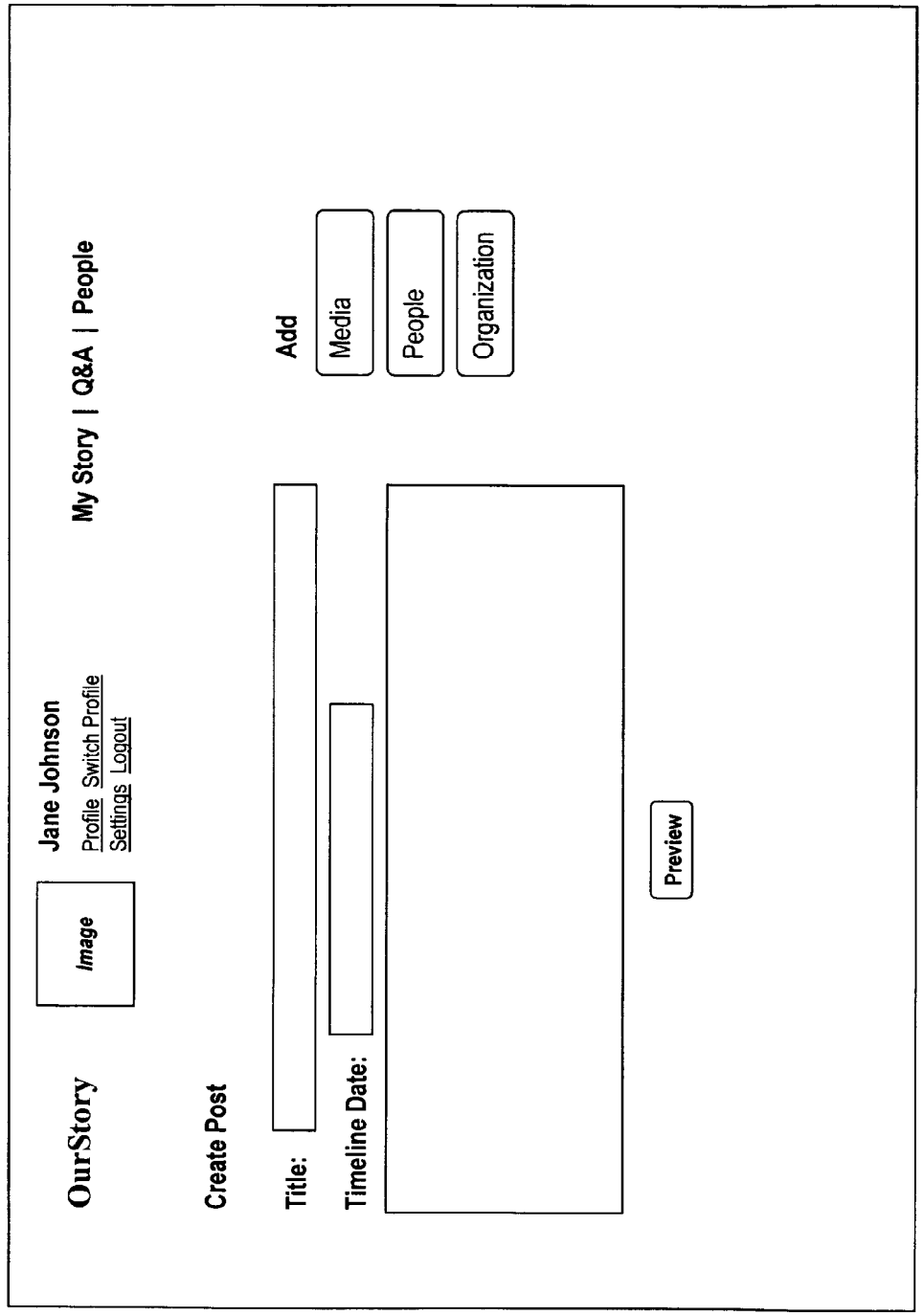

When the user clicks on the Post to My Story hyperlink, the GUI of FIG. 3C is displayed. This GUI includes input fields for the title, the date, and the word description for the post. The GUI of FIG. 3C further includes hyperlinks to a web page for adding media to the post (Media), identifying persons or groups who are part of the story (People), and specifying additional information such as locations and keywords (Organization). The media that is added may be any of the following: (i) images that the user uploaded, (ii) images others have uploaded and shared with the user, (iii) images that are retrieved from an image search conducted on the web based on the context of the post, (iv) images from third party photo sharing sites, (v) video files, (vi) audio files, and (vii) flash animation files. After all inputs have been made to the GUI of FIG. 3C, the user clicks on the Preview button in response to which a Preview Post web page like the one shown in FIG. 3D is displayed to the user. The user can specify permissions levels for viewing and commenting on this post on this web page. A public permissions level allows any user to view and comment on this post. A restricted permissions level allows only those users who are in the groups that have been checked to view and comment on this post. When the user clicks on the Publish button, the data relating to this post, including the word description, the attached media file, and the permissions level settings are transmitted to the server computer 110 along with data that identifies the person who is the subject of this life story. The identifying data may be the user ID of the person submitting the life story or the user ID of the person on behalf of whom the life story is submitted. In the case where a single user is maintaining multiple profiles and their stories and the user is submitting a story for one of these profiles, the identifying data may be an ID corresponding to that profile.

FIG. 4A is a schematic representation of the web page that is generated by the server computer 110 and transmitted to a user for display when the user selects the Q&A hyperlink from the navigation section 210. The web page provides a hyperlink next to each name and image of those users to whom the user may submit questions. The hyperlink brings up a GUI that is shown in FIG. 4B. The GUI of FIG. 4B identifies the user to whom the question will be posed and a series of questions organized into chapters and sets. In this example, the questions are arranged into four chapters, each chapter containing multiple question sets and each question set containing one or more questions. All of the questions shown here belong to a question package labeled as Life. Questions of other packages may be accessed. In this example, the other packages include a Career package which includes questions that are relevant to a person's career, and a My Questions package which includes those questions that have been saved or customized by the user or questions that have been saved or customized by other users and shared with the user.

Figure 4D:
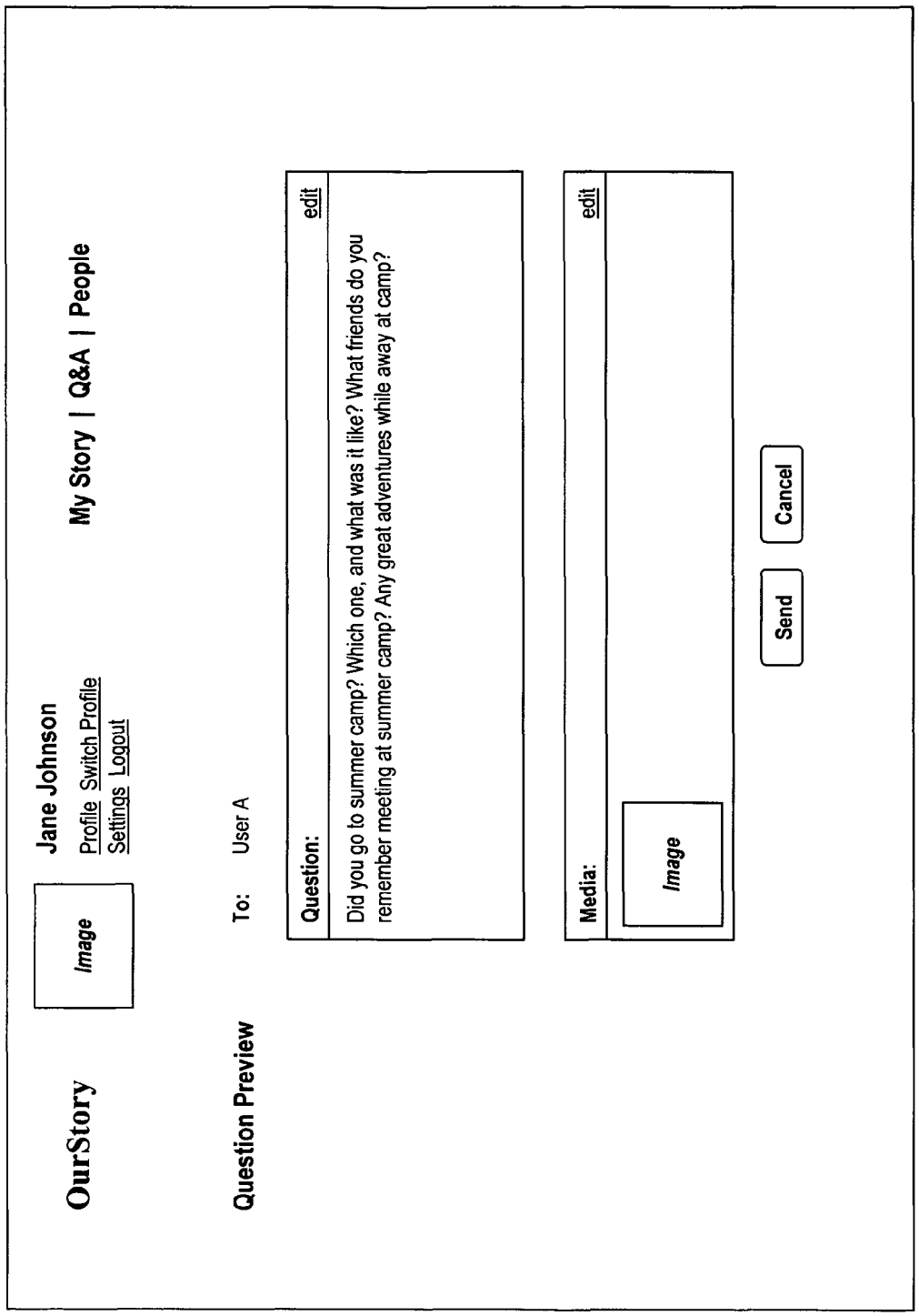

Questions can be authored from scratch by clicking on the Compose hyperlink. Questions can also be selected from the list shown in FIG. 4B, which represents those that have been pre-loaded into the system. Any selected question can also be edited using the GUI shown in FIG. 4C. If the user authors or edits any question, that question is saved into the custom set that is managed by the user so that it can be used again to question additional users or shared with other users. The GUI of FIG. 4C identifies the recipient of the question and includes an editable text window containing the question title and the question. The GUI of FIG. 4C further includes a GUI element for attaching an image that is relevant to this question. After all inputs have been made, the user clicks the Preview button in response to which a Question Preview web page like the one shown in FIG. 4D is displayed to the user. The user reviews the question and the attached media on this web page and clicks on the Send button if satisfied. In response, the data relating to this question, including the text of the question and the attached media file, are transmitted to the server computer 110 for storage and the question queue of the recipient of the question is updated to reflect this addition. The question and the associated data are also saved into the custom set that is managed by and reserved for the user.

FIG. 5 is a schematic representation of the web page that is generated by the server computer 110 and transmitted to a user for display when the user selects the People hyperlink from the navigation section 210. The web page provides hyperlinks to web pages for defining new private circles, and populating them with users (Create New Circles), managing invitations (Invite New Users), and performing searches of other registered users of the web site (Search Users). It also includes an image gallery of those users who are connected to the user. A connection to the user by another user exists or can be made by: (i) the user was invited by the other user or invited the other user onto the web site; or (ii) the user places the other user into one of his or her circles.

The users shown in the Connections window of the web page in FIG. 5 represent all users of the web site that are connected to the user. The View drop-down menu includes selections of user-defined private circles. The members that are displayed in the Connections window may be changed based on the selection made using the View drop-down menu. Also, once the display has changed to a selected private circle, other users may be added to the private circle through the Add hyperlink.

When a mouse pointer hovers over a user name or image displayed inside the Connections window, three selectable hyperlinks (View, Edit and Use) appear at the bottom of the user's name. The View hyperlink accesses the My Story web page of this user. The Edit hyperlink allows this user's displayed name or image to be changed. The Use hyperlink accesses the GUI of FIG. 3C using which a life story may be posted on behalf of this user.

Figure 6:
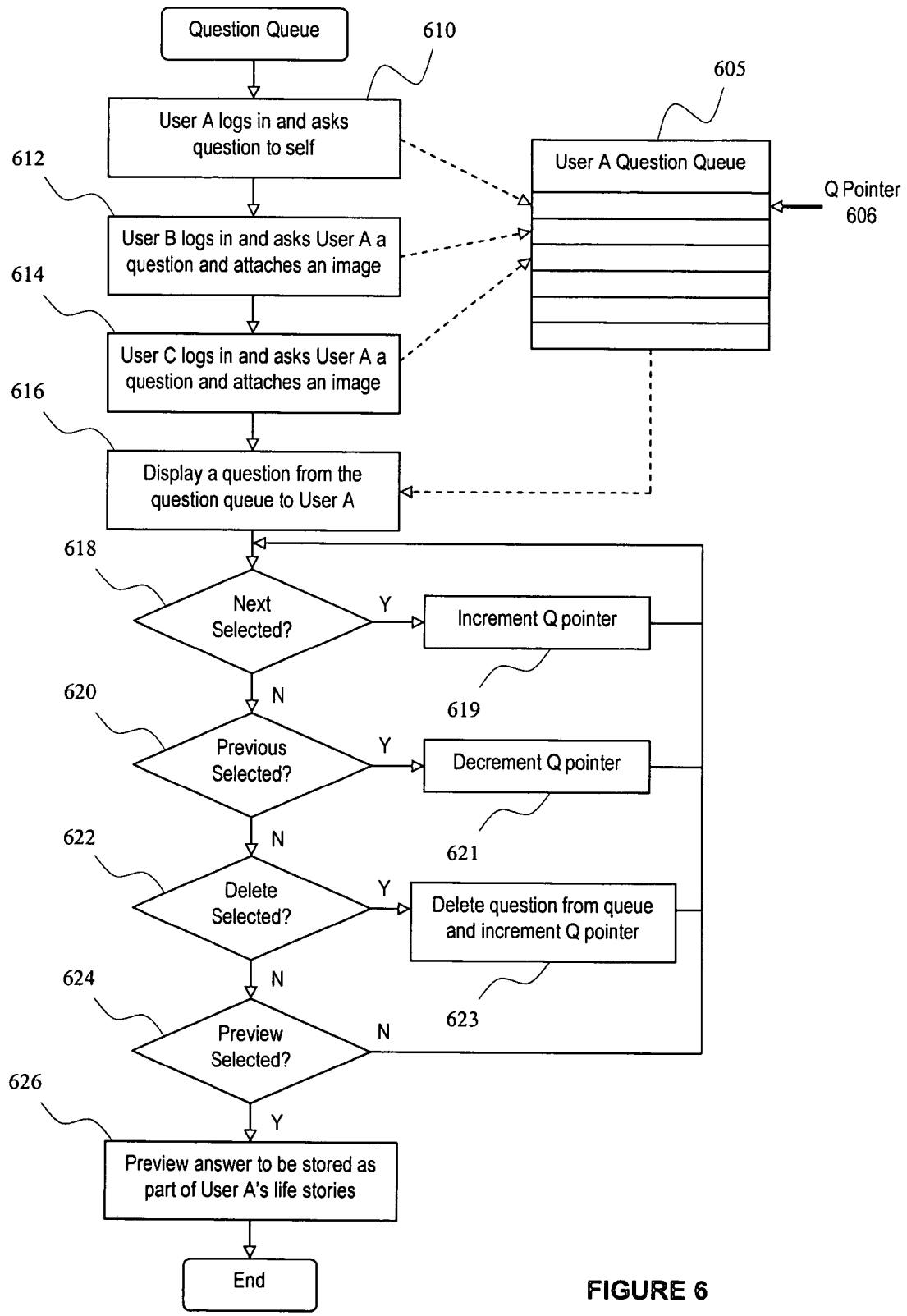
FIG. 6 is a flow diagram that illustrates the method steps carried out by the server computer to manage a question queue of a user.

FIG. 6 is a flow diagram that illustrates the method steps carried out by the server computer to manage the question queue of a user. In this example, the process of managing the question queue of User A is examined. The process begins when a question is posed to User A. The question to User A may be posed by User A (step 610) or by other users, User B (step 612) or User C (step 614). In steps 612 and 614, both User B and User C are attaching an image to the question posed to User A. In general, the attachment of an image to a question gives the question and the answer given in response to the question more context. All of the questions posed to User A are stored in the mass storage unit 113 and organized as a queue of questions with the questions ordered from the oldest one to the newest one.

In FIG. 6, a question queue 605 is illustrated schematically along with a question pointer 606. The question pointer 606 points to the position in the question queue 605 from which a question will be retrieved for inclusion in the web page that will be transmitted to the user. When User A logs into the web site or navigates back to the home page of the web site after having logged in, the server computer 110 generates electronic content that includes the GUI elements of the web page shown in FIG. 2. The GUI elements display one question from User A's question queue (step 616). The question that is selected for display is the question in the question queue 605 to which the question pointer 606 is currently pointing. Alternatively, additional questions from the question queue may be transmitted and loaded into User A's computer so that they can be rapidly displayed to the user if the user clicks on the Next hyperlink or the Previous hyperlink.

If the Next hyperlink (see the question section 220 of FIG. 2) is selected by User A (step 618), the question pointer 606 will be incremented (i.e., move down one position) (step 619) and the question section 220 of FIG. 2 will display the next question in the question queue, and if the Previous hyperlink is selected by User A (step 620), the question pointer 606 will be decremented (i.e., move up one position) (step 621) and the question section 220 of FIG. 2 will display the previous question in the question queue. If the Delete hyperlink is selected by User A (step 622), the currently displayed question will be deleted from the question queue, and the question pointer 606 will be incremented (step 623). If the Preview hyperlink is selected by User A (step 624), a preview web page similar to the one shown in FIG. 3D will be displayed to the user, using which the user can either publish the answer as a life story or cancel it. If the user publishes the answer, the server computer 110 saves the answer and the associated image in the mass storage unit 113 (step 626). Further, in response to either the publishing or canceling action, the next question in the queue will be displayed to the user.

Figure 7:
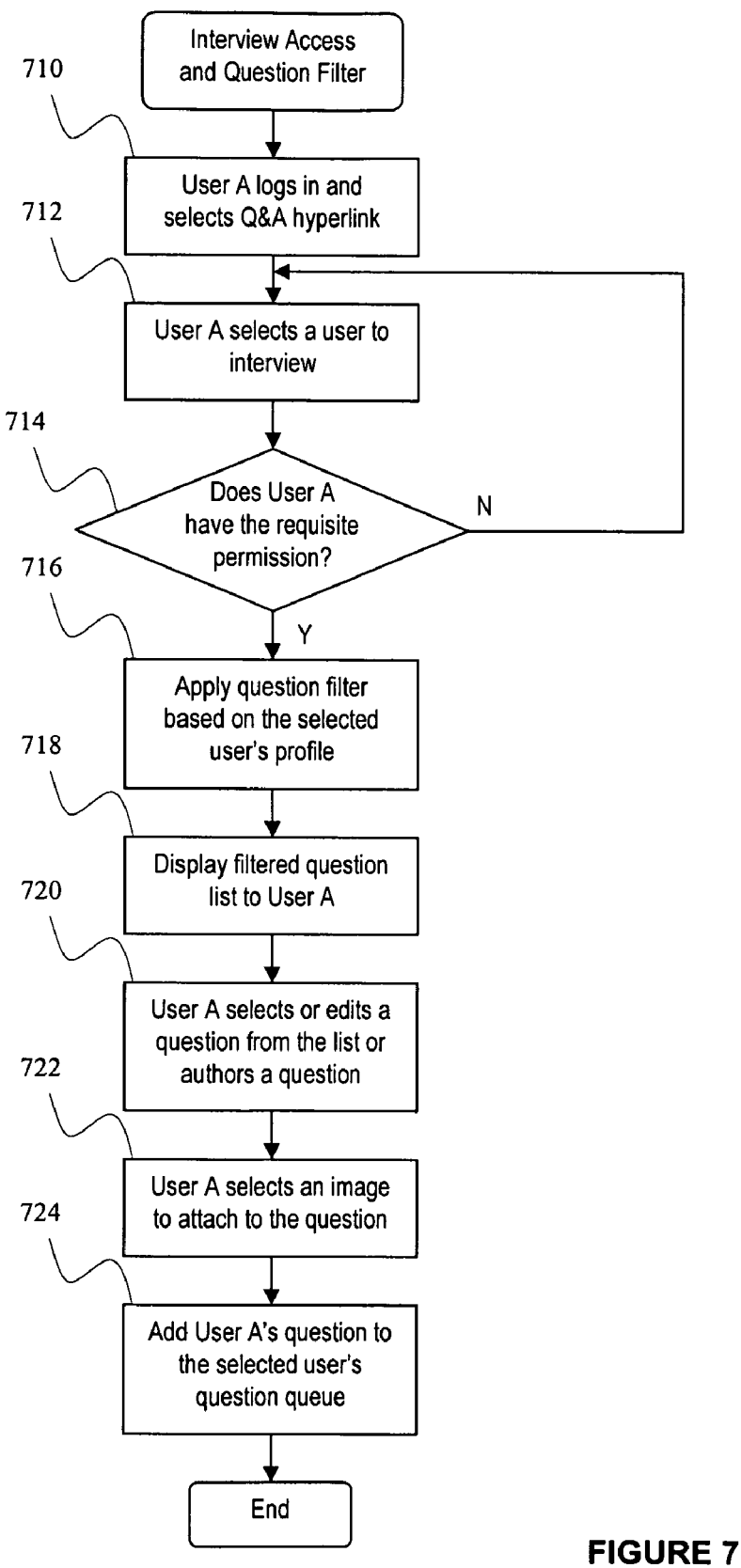
FIG. 7 is a flow diagram that illustrates the method steps carried out by the server computer to manage interview access rights and question filters.

FIG. 7 is a flow diagram that illustrates the method steps carried out by the server computer to manage interview access rights and question filters. In general, all users have the right to interview another user. However, as a way to deter spamming, the interview privileges may be restricted only to connected users. Also, if a user has the right to interview another user, the questions that are displayed to the user for selection are filtered based on the other user's profile so that a more relevant set of questions are displayed to the user for selection. For example, if the user to be interviewed is not married, questions that are only relevant to married people are filtered out and are not displayed as available selections to the user who is selecting the interview questions. Other profile data that may be used in the filtering process include age, gender, number of children, etc.

In the process example illustrated in FIG. 7, User A is specifying (composing, editing or selecting) questions to be asked other users. When User A logs into the web site or navigates back to the home page of the web site after having logged in, the server computer 110 generates electronic content that includes the GUI elements of the web page shown in FIG. 2. In step 710, User A selects the Q&A hyperlink provided in the navigation section 210 of FIG. 2, and in response, the server computer 110 supplies a web page like the one shown in FIG. 4A to User A. In step 712, User A selects a user to interview. If the selected user has not given User A the right to interview him or her (step 714), a message indicating this is displayed to User A and prompts User A to make another selection. If User A has the right to interview the selected user, the process continues to step 716. In step 716, the server computer 110 applies a question filter to a set of questions that have been pre-loaded into the mass storage unit 113 so that a reduced, more relevant set is generated for selection by User A. The filtering is performed based on the profile data of the selected user that is maintained by the web site. The filtered question set is displayed to User A in step 718 for selection by User A. At this point in the process, User A may select one of the displayed questions or compose a new question from scratch (step 720). In either case, User A may select an image to be attached to the question (step 722). Upon submission of the question and the attached image by User A, the question and the attached image are placed into the selected user's question queue (step 724).

Figure 8:
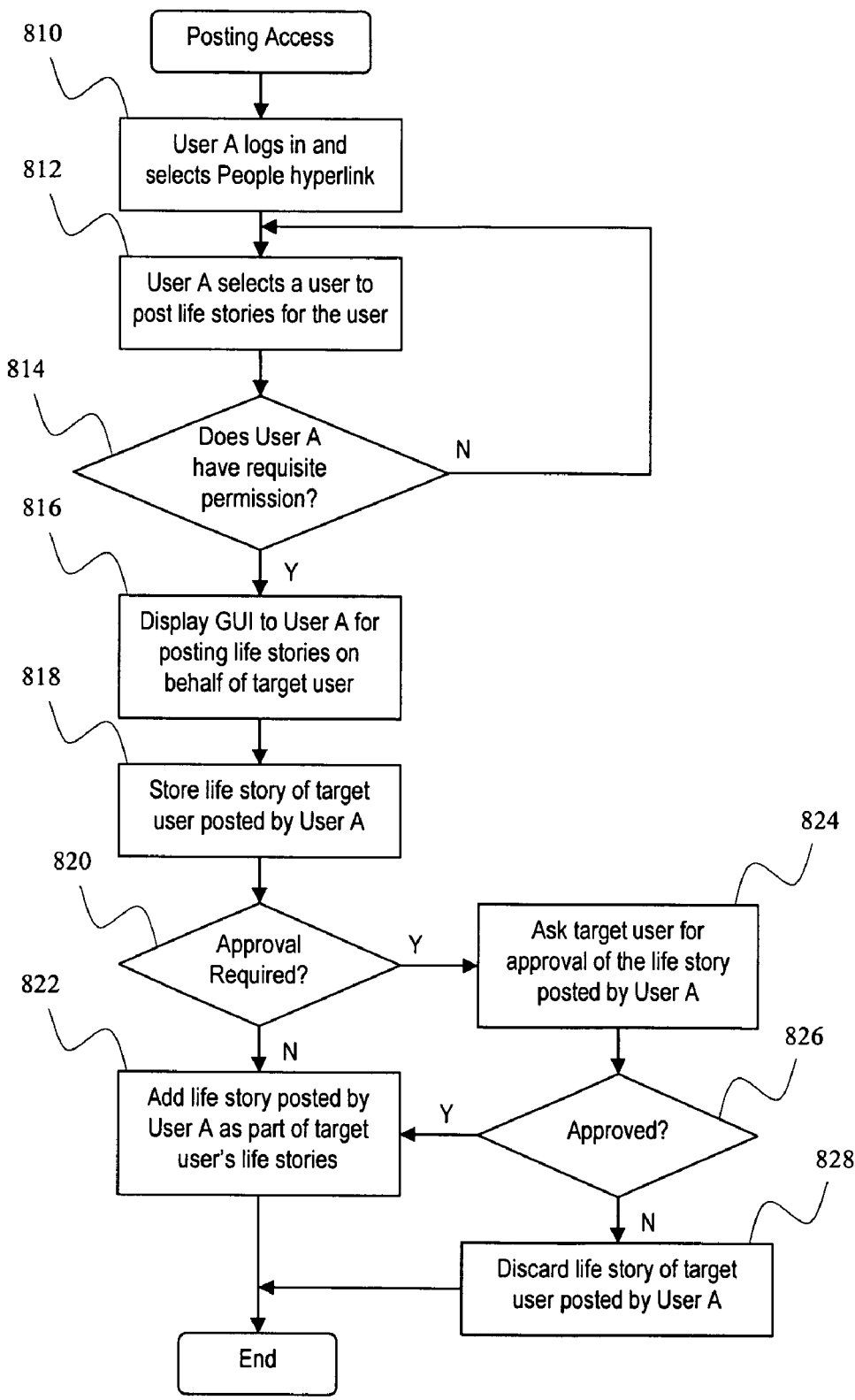
FIG. 8 is a flow diagram that illustrates the method steps carried out by the server computer to manage posting access rights and the associated approval process.

FIG. 8 is a flow diagram that illustrates the method steps carried out by the server computer to manage posting access rights and approval process. In the embodiments of the present invention illustrated herein, users may post life stories on behalf of other users so long as they have posting access rights to do so. The right to post life stories on behalf of a user is set by the user in his or her profile. As one example, four settings of posting access rights may be defined in the user's profile. The first is "No Submission." This setting does not permit any posting on behalf of the user. The second is "With Approval." This setting permits anyone to post on behalf of the user, but the user must approve of the post before it becomes part of the user's life stories. The third is "Open." This setting permits anyone to post on behalf of the user and the user does not need to approve of the post. The fourth is a special setting. When this setting is selected, anyone may post life stories on behalf of the user and if the submitter is connected to the user, no approval is required. On the other hand, if the submitter is not connected to the user, the user must approve of the post before it becomes part of the user's life stories.

The web page for posting a life story on behalf of another user may be accessed in a number of different ways. It can be accessed through the collaboration section 250 of FIG. 2. A. It can be accessed by first navigating to the My Story web page of another user (e.g., by clicking on the user's name or image appearing on any web page) and then clicking on the Post to My Story hyperlink. Another way is to navigate to the People web page shown in FIG. 5 and selecting the Use hyperlink that appears after positioning the mouse pointer to hover over the desired user's name or image. In all cases, the web page that appears is similar to the Create Post web page shown in FIG. 3C.

In the process example illustrated in FIG. 8, User A is posting a life story on behalf of another user. When User A logs into the web site or navigates back to the home page of the web site after having logged in, the server computer 110 generates electronic content that includes the GUI elements of the web page shown in FIG. 2. In step 810, User A selects the People hyperlink provided in the navigation section 210 of FIG. 2, and in response, the server computer 110 supplies a web page like the one shown in FIG. 5 to User A. In step 812, User A selects the Use hyperlink that appears after positioning the mouse pointer to hover over the target user's name or image. The server computer 110 examines the target user's profile to determine if User A has the requisite permission to post a life story on behalf of the target user (step 814). If User A does not, the server computer 110 transmits an appropriate message to be displayed to User A and waits for another selection by User A. If User A has the requisite permission, the process continues to step 816, where the GUI similar to the one shown in FIG. 3C is displayed to User A. After User A makes the inputs to this GUI, previews the inputs and publishes them, the server computer 110 stores the life story of the target user (step 818). The server computer 110 then checks the target user's profile to determine if life stories posted by other users are automatically approved (step 820). If this is the case, the life story stored in step 818 is saved as part of the target user's life stories (step 822). On the other hand, if approval by the target user is required, the server computer 110 generates a message to be placed in the target user's inbox asking the target user's approval of the life story (step 824). If the target user approves (step 826), the process continues to step 822 where the life story stored in step 818 is saved as part of the target user's life stories. If the target user rejects, the life story posted by User A is discarded (step 828). The process ends after step 822 or step 828.

While particular embodiments according to the invention have been illustrated and described above, those skilled in the art understand that the invention can take a variety of forms and embodiments within the scope of the appended claims.

What is claimed is:

1. A method for communicating with a first individual to generate life stories of a second individual, said method comprising the steps of:

presenting a GUI to the first individual, the GUI including a first hyperlink to a web page for managing relationship data of the first individual and a second hyperlink to a web page for inputting life stories on behalf of the second individual;

receiving an input from the first individual, the input selecting said second hyperlink;

presenting said web page for inputting life stories on behalf of the second individual, the web page including a first section for inputting text and a second section for attaching an image;

receiving text inputs from the first individual through the first section of the web page and an image selection through the second section of the web page, the text inputs describing a life event of the second individual and the selected image being associated with said life event; and transmitting the text inputs and the selected image to a host computing device over a computer network along with data that associates the text inputs and the selected image with the second individual.

2. The method according to claim 1, wherein the first individual and the second individual are registered users of an online system that maintains biographical accounts for each of the first and second individuals.

3. The method according to claim 1, wherein the first individual is a registered user of an online system that allows multiple profiles to be created by a single registered user and maintains biographical accounts for each of the profiles, and wherein the multiple profiles of the first individual includes a profile of the first individual and a profile of the second individual.

4. The method according to claim 1, wherein the GUI includes a first section for entering text, a second section for attaching images, and a third section for entering a date.

5. The method according to claim 1, further comprising the step of receiving electronic content from the host computing device over the computer network for display, the electronic content comprising biographical accounts of the second individual including said text inputs from the first individual.

6. The method according to claim 1, further comprising the steps of:

presenting the text inputs from the first individual to the second individual for approval; and receiving an input made by the second individual, the input indicating approval or rejection of the text inputs from the first individual.

7. A collaborative system accessed by multiple users for communicating with the multiple users to generate life stories of the multiple users, the system comprising:

a memory unit storing profile data about the multiple users; and a processor programmed to generate web pages based in part of said profile data and transmit said web pages to the multiple users in response to inputs received from the multiple users, at least one of the web pages to be transmitted to one of the multiple users including a graphical user interface (GUI) that displays a question that is posed by another one of the multiple users;

wherein said at least one of the web pages further includes a first hyperlink to a web page used for inputting life stories on behalf of another one of the multiple users and a second hyperlink to a web page used for specifying a question to be posed to another one of the multiple users.

8. The collaborative system according to claim 7, wherein said at least one of the web pages further includes a plurality of images, a first one of which is associated with a life story of another one of the multiple users and a second one of which is associated with a comment made by another one of the multiple users regarding a life story of said one of the multiple users.

9. The collaborative system according to claim 7, wherein the memory unit stores profile data about a user as inputted by the user and profile data about one or more characters or groups as inputted by the user, and the memory unit stores stories about each of said one or more characters or groups as inputted by the user.

10. The collaborative system according to claim 9, wherein said one or more characters or groups includes a fictional character.

* * * * *